United States Patent [19]
Suehiro et al.

[11] Patent Number: 5,041,338
[45] Date of Patent: Aug. 20, 1991

[54] POLYPROPYLENE COMPOSITION

[75] Inventors: Keigo Suehiro, Kanagawa; Takashi Miyazaki, Tokyo; Katsuyuki Nitta, Kanagawa; Sachio Yokote, Kanagawa; Yoichi Kawai, Kanagawa, all of Japan

[73] Assignee: Mitsui Toatsu Chemicals, Inc., Tokyo, Japan

[21] Appl. No.: 442,689

[22] Filed: Nov. 28, 1989

[30] Foreign Application Priority Data

Feb. 12, 1988 [JP] Japan .................. 63-304209

[51] Int. Cl.$^5$ ................ B32B 27/08; B32B 27/28; C08L 51/06; C08L 53/00
[52] U.S. Cl. .................. 428/516; 428/476.1; 525/71; 525/66; 525/57; 524/504
[58] Field of Search ............ 428/516, 476.1; 525/71

[56] References Cited

U.S. PATENT DOCUMENTS

| 3,041,169 | 6/1962 | Wielicki | 430/100 |
| 3,216,844 | 11/1965 | King | 430/100 |
| 3,384,488 | 5/1968 | Tulagin et al. | 430/32 |
| 4,510,286 | 4/1985 | Liu | 525/71 |
| 4,774,144 | 9/1988 | Jachec et al. | 428/516 |

FOREIGN PATENT DOCUMENTS

| 59-068366 | 4/1984 | Japan | 525/71 |
| 63-097655 | 4/1988 | Japan | 525/71 |

Primary Examiner—Carman J. Seccuro
Attorney, Agent, or Firm—Burns, Doane, Swecker & Mathis

[57] ABSTRACT

The present invention relates to a polypropylene composition useful as an adhesive comprising a modified polypropylene resin graft-modified with from about 0.01 wt. % to about 2 wt. % of a radical-polymerizable unsaturated compound and a crystalline propylene-/ethylene block copolymer containing from about 10 wt. % to about 50 wt. % of a propylene/ethylene random copolymer having an ethylene content of from about 20 wt. % to about 90 wt. %. The resin composition is particularly suitable for bonding a polypropylene resin layer and an ethylene/vinyl alcohol copolymer layer, and a polypropylene resin layer and a polyamide resin layer.

10 Claims, No Drawings

POLYPROPYLENE COMPOSITION

BACKGROUND OF THE INVENTION

1. Field of the Invention

The present invention relates to an adhesive polypropylene composition useful as an adhesive and more particularly, to a polypropylene composition useful as an adhesive between a polypropylene resin layer and an ethylene/vinyl alcohol copolymer layer or a polyamide resin layer.

2. Description of the Related Art

Laminates comprising a polypropylene resin layer and an ethylene/vinyl alcohol copolymer layer, or a polypropylene resin layer and a polyamide resin layer are low in oxygen permeability and moisture vapor permeability, and therefore are widely used, for example, for containers for foods and medicines.

However, since adhesion between a polypropylene resin layer and an ethylene/vinyl alcohol copolymer layer or a polyamide resin layer is poor, a molding method is generally employed wherein an adhesive layer is placed between the resin layers by co-extrusion.

It is well known that polyolefin resins graft-modified with an unsaturated carboxylic acid or derivative thereof may be used as a bonding layer (see for example Japanese Patent Application Laid-Open Nos. 5527/1973, 98784/1976, and 26548/1977).

It is also known that the bonding strength between the resin layers may be improved by adding a low-density polyethylene to the graft-modified polyolefin resin (see for example Japanese Patent Publication No. 40113/1979), adding a high-density polyethylene to the graft-modified polyolefin resin (see for example Japanese Patent Publication No. 36586/1984), adding a hydrocarbon elastomer to the graft-modified polyolefin resin (see for example Japanese Patent Publication No. 40112/1979). It is also known to use a mixture comprising a propylene/ethylene block copolymer, an ethylene/α-olefin random copolymer, an unsaturated carboxylic acid or its derivative and an organic peroxide (see for example Japanese Patent Application Laid-Open No. 41205/1981). However, such a method results in an odor and inferior coloring due to unreacted monomers.

When compositions prepared by adding a low-density polyethylene, a high-density polyethylene, or a hydrocarbon elastomer to a graft-modified polyolefin resin are employed as an adhesive layer, the performance is inadequate. For example, in the case wherein a laminate made up of a polypropylene resin layer and an ethylene/vinyl alcohol copolymer layer or a polyamide layer is blow molded into a bottle, the thin section of the product is low in adhesion strength. Accordingly, further improvement is required.

Further, the above prior art compositions have low softening points and as a result the adhesion strength under high temperatures is low.

SUMMARY OF THE INVENTION

The present invention overcomes the problems and disadvantages of the prior art by providing a polypropylene resin composition useful as an adhesive, particularly as an adhesive between a polypropylene resin layer and an ethylene/vinyl alcohol copolymer layer or a polyamide resin layer.

It is an object of the invention to provide a polypropylene resin composition that is useful as an adhesive for bonding a polypropylene resin layer and an ethylene/vinyl alcohol copolymer layer or a polyamide resin layer.

It is a further object of the invention to provide a polypropylene resin composition that has superior bonding strength at high temperatures.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects in accordance with the purpose of the invention, as embodied and broadly described herein, the present invention provides a polypropylene resin composition useful as an adhesive, particularly for bonding a polypropylene resin layer and an ethylene/vinyl alcohol copolymer layer or a polyamide resin layer comprising a modified polypropylene resin graft-modified with from about 0.01 wt. % to about 2 wt. % of a radical-polymerizable unsaturated compound and a crystalline propylene/ethylene block copolymer containing from about 10 wt. % to about 50 wt. % of a propylene/ethylene random copolymer having an ethylene content of from about 20 wt. % to about 90 wt. %.

DESCRIPTION OF THE PREFERRED EMBODIMENTS

Reference will now be made in detail to the present preferred embodiments of the invention.

The modified polypropylene resin employed in the present invention may be prepared by numerous processes. Exemplary suitable processes include a process wherein a polypropylene resin obtained by polymerization is mixed with a prescribed amount of an organic solvent (e.g., chlorobenzene), and then heated to form a solution. A solution containing a prescribed amount of organic peroxide (e.g., di-t-butyl peroxide), an organic solvent, and a radical-polymerizable unsaturated compound (e.g., an unsaturated carboxylic acid such as maleic anhydride) is added thereto under an atmosphere of nitrogen, and the mixture is stirred under heating to react for a certain period of time. The the reaction mixture is then cooled, filtered, and dried to produce a grafted polypropylene. Generally, the graft ratio is not greater than about 20 wt. %.

There is no particular limitation on the type of polypropylene to be grafted, and use can be made, for example, of propylene homopolymers and propylene/α-olefin copolymers, and thermally degraded homopolymers and copolymers obtained by heating the polymers in the presence of a thermal degrading agent.

Exemplary suitable radical-polymerizable unsaturated compounds for use in the invention include α, β-unsaturated aliphatic mono- and di-carboxylic acids, and their derivatives such as acrylic acid and methacrylic acid, and their methyl ester compounds, itaconic acid, maleic acid, and citraconic acid, or their anhydride, ester, and amide compounds. Maleic anhydride is particularly preferred.

Although the content of the graft-modified polypropylene resin in the present composition will vary depending on the graft ratio of the grafted polypropylene, the modified polypropylene resin is present in an amount such that the content of the radical-polymerizable unsaturated compound in the composition of the invention is from about 0.01 to about 2 wt. %, preferably from about 0.05 to about 1 wt. %. The inventors have found that the radical-polymerizable unsaturated compound is present in an amount less than about 0.01 wt. %, the adhesion strength is low, whereas if present in an amount greater than about 2 wt. %, the cost of production increases and the adhesion strength tends to decrease.

The crystalline propylene/ethylene block copolymer employed in the invention is a crystalline propylene-/ethylene block copolymer containing from about 10 to about 50 wt. % of a propylene/ethylene random copolymer segment having an ethylene content of from about 20 to about 90 wt. %.

An exemplary suitable process for preparing a crystalline propylene/ethylene block copolymer for use in the invention includes using a catalyst system containing a mixture of at least one transition metal catalyst such as $TiCl_3.1/3AlCl_3$ or carrier catalysts including a titanium compound supported on a magnesium compound such as $MgCl_2$ with one or more organic aluminum catalysts such as $Al Et_3$, $Al Et_2Cl$, $Al Et_2H$, or $Al-iso-Bu_3$, and if necessary, a third component such as an ester compound and an ether compound.

The propylene/ethylene block copolymer preferably contains (A) from about 50 wt. %, to about 90 wt. %, more preferably from about 80 to about 60 wt. %, of a propylene-rich polymer containing at least about 97 wt. %, most preferably at least about 98 wt. % of propylene, and (B) from about 10 to about 50 wt. %, more preferably from about 20 to about 40 wt. %, of a propylene/ethylene random copolymer having a propylene/ethylene weight ratio of from about 80/20 to 10/90, more preferably from about 70/30 to 20/80.

A polymerization process wherein suspension polymerization is effected in an inert solvent such as heptane or hexane or liquefied propylene, a gas phase polymerization process, or a combination of these processes may be employed. It is preferred to polymerize the propylene/ethylene random copolymer in the latter stage in view of handling (see for example Japanese Patent Application Laid-Open Nos. 41311/1984, and 41316/1984).

Applicants have found that if the propylene/ethylene random copolymer in the crystalline propylene/ethylene block copolymer is present in an amount less than about 10 wt. %, the adhesive strength decreases. On the other hand if present in an amount greater than about 50 wt. %, the resulting adhesive polypropylene decreases in rigidity, and the adhesion strength thereof at high temperatures decreases.

In addition, the crystalline propylene/ethylene block copolymer used may also contain a propylene homopolymer segment, which may be formed by copolymerization of propylene with an α-olefin other than propylene if the α-olefin is employed in an amount that does not adversely effect the properties of the composition of the present invention.

To the present adhesive polypropylene composition may be added, if required, other resins and additives such as usual medium- to low-density polyethylenes, ultra-low-density polyethylenes, hydrocarbon elastomers, ethylene/vinyl acetate copolymers, ethylene/vinyl alcohol copolymers, polyamides, antioxidants, ultraviolet absorbers, pigments, dyes, fillers, nucleating agents, anti-blocking agents, slip agents, antistatic agents, and fire retardants. Providing such additives are employed in an amount that does not adversely effect the properties of the composition of the present invention.

The present polypropylene composition may be prepared by premixing the components by a Henschel mixer, and then melting and kneading the mixture by a uniaxial extruder, a biaxial extruder or the like to be pelletized.

A laminate consisting of an ethylene/vinyl alcohol copolymer layer or a polyamide layer and a polypropylene resin layer by using the present polypropylene composition as an adhesive may be prepared by the following process.

Generally known polypropylenes, ethylene/vinyl alcohol copolymers, and polyamides may be employed in the present invention. If required, these compounds contain known additives such as antioxidants, ultraviolet absorbers, pigments, dyes, fillers, nucleating agents, anti-blocking agents, slip agents, antistatic agents, and fire retardants.

The following exemplary methods may be employed to produce a laminate from the composition of the invention. A method may be employed wherein films or sheets of a polypropylene layer, an ethylene/vinyl alcohol copolymer layer or polyamide resin layer respectively, and an adhesive layer are prepared, the adhesive layer is sandwiched between the other resin films or sheets, followed by thermocompression bonding; a method wherein a melted adhesive layer composition is extruded onto one of a polypropylene resin film or sheet, and an ethylene/vinyl alcohol copolymer or polyamide resin film or sheet, and the other resin film or sheet is placed thereon; and a method wherein polypropylene, ethylene/vinyl alcohol copolymer or polyamide resin, and an adhesive layer composition are melted in extruders and are co-extruded through a single die.

The extrusion temperature at which the polypropylene, the ethylene/vinyl alcohol copolymer or the polyamide resin is extruded may be an extrusion temperature conventionally used. The extrusion temperature at which the adhesive layer composition is extruded is preferably from about 190° to about 300° C., more preferably from about 200° to about 280° C.

Preferably, the thickness of the adhesive layer is from about 0.005 to about 0.1 mm. If the thickness is less than about 0.005 mm, the adhesive strength of the laminate is inadequate. On the other hand, if the thickness is greater about 0.1 mm, the adhesion strength can not be increased.

The laminate may be in the shape, for example, of a film, a sheet, a pipe, a corrugated sheet, or a container such as a bottle made for example by injection molding or blow molding. It is also possible to produce a laminate sheet and then form various containers therefrom, for example, by vacuum forming or air-pressure forming.

The laminate can be formed into blown containers, films, sheets or the like that can be uniaxially or biaxially stretched.

The invention will be further clarified by the following examples, which are intended to be purely exemplary of the invention.

EXAMPLES

In the following description, the adhesive strength was measured in accordance with JIS-K-6854 (T-type peeling test).

The proportion of the propylene/ethylene random copolymer was determined on the basis of the material balance at the time of polymerization, and the ethylene content of the propylene/ethylene random copolymer segment was determined in such a manner that the ethylene content of the the propylene/ethylene block copolymer was found according to a method using $^{13}$C-NMR (e.g., the method described by G.J. Ray et al. in Makromol, 10, 773 (1977)), and it then was calculated from the above proportion of the random copolymer.

EXAMPLES 1 TO 4 AND COMPARATIVE EXAMPLES 1 TO 3

Isotactic polypropylene having a molecular weight of 215,000 was passed through an extruder in the presence of 2,5-dimethyl-2,5-di(t-butylperoxy)hexane to degrade thermally. The thus prepared polypropylene having a molecular weight of 143,000 was reacted with maleic anhydride in chlorobenzene at 126° C. using dicumyl peroxide as a catalyst followed by cooling. The resulting slurry was washed with a large amount of acetone, filtered, and dried to obtain a grafted polypropylene. According to the IR measurement, the maleic anhydride content of the grafted polypropylene was 11.8 wt. %.

This grafted polypropylene and polypropylenes for blending shown in Table 1 were blended in the proportions set forth in Table 1. To 100 parts by weight of each of the blends were added 0.3 parts by weight of calcium stearate, 0.25 parts by weight of tris(2,4-di-t-butylphenyl)phosphite, and 0.3 parts by weight of pentaerythrityltetrakis [3-(3,5-di-t-butyl-4-hydroxyphenyl)propionate], and mixed by a Henschel mixer. Each mixture was pelletized by a 40-mm$\phi$ uniaxial extruder at 230° C. to produce polypropylene compositions for adhesive layers.

Each of the compositions obtained above, polypropylene (having an MI of 1.5 available under the trade name "Mitsui Noblen MJS-G" from Mitsui Toatsu Chemicals, Inc.), and ethylene/vinyl alcohol copolymer (having an MI of 1.3 available under the trade name "Eval F" from Kurare Co., Ltd.) were co-extruded by using a feed block die into three resins and five layers, i.e. a polypropylene layer/an adhesive layer/an ethylene/vinyl alcohol copolymer layer/an adhesive layer/a polypropylene layer thereby forming each parison with an outer diameter of 39 mm$\phi$ and a thickness of 4 mm, and the parison was molded by blow molding (at an air pressure of 5.0 kg/cm$^2$) into a container having a volume of 850 cc (the product weight: 56 g; and the outer diameter of the product: 90 mm$\phi$). In feeding the resins into the feed block, a 40-mm$\phi$ extruder was used for the polypropylene layer, a 30-mm$\phi$ extruder was used for the adhesive layer composition, and a 30-mm$\phi$ extruder was used for the ethylene/vinyl alcohol copolymer layer.

The side wall section of each container was removed, and the peel strength was measured. For the measurement, in addition to samples at room temperature (23° C.), samples heated to 80° C. and 120° C. were also used.

The extrusion temperature for each resin was 200° C. the extrusion temperature of the die section and the feed block section was also 200° C.

The thickness of the section where the peel strength had been measured was such that the polypropylene layer/the adhesive layer/the ethylene/vinyl alcohol copolymer layer/the adhesive layer/the polypropylene layer=0.45/0.03/0.04/0.03/0.04 mm.

TABLE 1

| | Polypropylene for blending | | | | | | |
|---|---|---|---|---|---|---|---|
| | Composition | | | | | | |
| | Proportion of propylene/-ethylene random copolymer segment in polypropylene for blending (wt. %) | Ethylene content of propylene/ethylene random copolymer segment (wt. %) | Added amount (wt. %) | Added amount of grafted polypropylene (wt. %) | Peel strength (g/cm) | | |
| | | | | | 23° C. | 80° C. | 120° C. |
| Ex. 1 | 30.4 | 59.6 | 97.5 | 2.5 | 3500 | 2800 | 2050 |
| Ex. 2 | 14.8 | 62.3 | 97.5 | 2.5 | 2600 | 2300 | 1900 |
| Ex. 3 | 45.2 | 32.6 | 97.5 | 2.5 | 3200 | 2640 | 1830 |
| Ex. 4 | 32.1 | 48.9 | 97.5 | 2.5 | 3160 | 2710 | 2130 |
| Com. Ex. 1 | 8.0 | 58.1 | 97.5 | 2.5 | 1260 | 1030 | 920 |
| Com. Ex. 2 | 54.2 | 60.4 | 97.5 | 2.5 | 3210 | 630 | 420 |
| Com. Ex. 3 | 35.2 | 17.3 | 97.5 | 2.5 | 1450 | 1320 | 1130 |

EXAMPLE 5

Example 1 was repeated, except that 94.5 wt. % of the propylene/ethylene copolymers employed in Example 1, 2.5 wt. % of the grafted polypropylene used in Example 1, and 3 wt. % of ethylene/butene-1 copolymer (D9510, manufactured by Nippon Petrochemicals Co., Ltd.) were used. The peel strength was 3,800 g/cm at 23° C., 3,050 g/cm at 80° C., and 2,230 g/cm at 120° C.

COMPARATIVE EXAMPLE 4

Example 1 was repeated, except that 72.5 wt. % of propylene/ethylene random copolymer whose ethylene content was 5.1 wt. % was employed, 2.5 wt. % of the grafted polypropylene employed in Example 1 and 25 wt. % of ethylene/propylene rubber (EP07P, manufactured by Japan Synthetic Rubber Co., Ltd.) were employed, thereby preparing an adhesive polypropylene composition. The molding carried out in Example 1 was conducted and the peel strength was measured. The peel strength was 3,350 g/cm at 23° C., 380 g/cm at 80° C., and 320 g/cm at 120° C., showing drastic decreases in the peel strength at high temperatures.

EXAMPLE 6

Example 1 was repeated, except that instead of the ethylene/vinyl alcohol copolymer used in Example 1 "UBE nylon 1011" was employed (that is a trade name and is manufactured by Ube Industries, Ltd.). The extrusion temperature of the nylon was 250° C., the temperature of the feed block was 250° C. and the temperature of the die was 245° C., thereby carrying out the test. The thickness of the section where the peel strength had been measured was such that the polypropylene layer/the adhesive layer/the nylon layer/the the adhesive layer/the polypropylene layer=0.45/0.04/0.03/0.04/0.4 mm.

The peel strength was 4,320 g/cm at 23° C., 3,620 g/cm at 80° C., and 3,050 g/cm at 120° C.

When the present polypropylene composition is used as an adhesive layer, the adhesion strength between a polypropylene layer and an ethylene/vinyl alcohol copolymer layer or a polyamide layer can be made high. When a laminate formed by using the present polypropylene composition is molded into a product, for example, by blow molding or vacuum forming, the adhesion strength of the product is good even at a thin wall section and good adhesion strength can be maintained even at high temperature. The, laminate is useful for example for producing containers for retort pouch food.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polypropylene composition useful as an adhesive comprising a modified polypropylene resin graft-modified with from about 0.01 wt. % to about 2 wt. % of a radical-polymerizable unsaturated compound selected from the group consisting of α, β-unsaturated aliphatic monocarboxylic acids, derivatives thereof, α, β-unsaturated di-carboxylic acids and derivatives thereof and a crystalline propylene/ethylene block copolymer containing from about 10 to about 50 wt. % of a propylene/ethylene random copolymer having an ethylene content of from about 30 wt. % to about 80 wt. %.

2. The polypropylene composition of claim 1 wherein said radical-polymerizable unsaturated compound is present in said polypropylene composition in an amount of from about 0.05 to about 1 wt. %.

3. The polypropylene composition of claim 1 wherein said radical-polymerizable unsaturated compound is selected from the group consisting of acrylic acid, methacrylic acid, itaconic acid, maleic acid, and citraconic acid, and anhydrides, esters and amides thereof.

4. The polypropylene composition of claim 3 wherein said radical-polymerizable unsaturated compound is maleic anhydride.

5. The polypropylene composition of claim 1 wherein said crystalline propylene/ethylene block copolymer contains from about 50 wt. % to about 90 wt. % of a propylene-rich polymer containing at least about 97 wt. % propylene, and from about 10 wt. % to about 50 wt. % of a propylene/ethylene random copolymer having a propylene/ethylene weight ratio of from about 70/30 to 20/80.

6. The polypropylene composition of claim 5 wherein said crystalline propylene/ethylene block copolymer contains from about 60 wt. % to about 80 wt. % of a propylene-rich polymer segment containing at least about 98 wt. % propylene, and from about 20 wt. % to about 40 wt. % of a propylene/ethylene random copolymer having a propylene/ethylene weight ratio of from about 70/30 to 20/80.

7. The polypropylene composition of claim 1 wherein said crystalline propylene/ethylene block copolymer further comprises a propylene homopolymer.

8. The polypropylene composition of claim 1 further comprising an additive.

9. The polypropylene composition of claim 8 wherein said additive is selected from the group consisting of medium to low density polyethylenes, ultra-low-density polyethylenes, hydrocarbon elastomers, ethylene/vinyl acetate copolymers, ethylene/vinyl alcohol copolymers, polyamides, antioxidants.

10. A laminate having at least one layer comprising the polypropylene composition of claim 1.

* * * * *